(12) United States Patent
Khalid et al.

(10) Patent No.: US 10,587,647 B1
(45) Date of Patent: Mar. 10, 2020

(54) TECHNIQUE FOR MALWARE DETECTION CAPABILITY COMPARISON OF NETWORK SECURITY DEVICES

(71) Applicant: FireEye, Inc., Milpitas, CA (US)

(72) Inventors: Yasir Khalid, Fremont, CA (US); Nadeem Shahbaz, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 212 days.

(21) Appl. No.: 15/358,688

(22) Filed: Nov. 22, 2016

(51) Int. Cl.
- *G06F 11/00* (2006.01)
- *H04L 29/06* (2006.01)
- *G06F 9/455* (2018.01)
- *G06F 12/14* (2006.01)

(52) U.S. Cl.
CPC ........ *H04L 63/145* (2013.01); *G06F 9/45558* (2013.01); *H04L 63/1416* (2013.01); *H04L 63/1433* (2013.01); *G06F 2009/45587* (2013.01); *G06F 2009/45595* (2013.01)

(58) Field of Classification Search
CPC . G06F 21/53; G06F 9/45533; H04L 63/0227; H04L 63/1416; H04L 67/02
USPC .............................................. 726/11, 22, 23
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |
| 5,960,170 A | 9/1999 | Chen et al. | |
| 5,978,917 A | 11/1999 | Chi | |
| 5,983,348 A | 11/1999 | Ji | |
| 6,088,803 A | 7/2000 | Tso et al. | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Gary S Gracia
(74) *Attorney, Agent, or Firm* — Rutan & Tucker, LLP

(57) ABSTRACT

A testing technique tests and compares malware detection capabilities of network security devices, such as those commercially available from a variety of cyber-security vendors. Testing is conducted on test samples in a "blind" fashion, where the security devices do not know beforehand whether the test samples are "live" malware or benign network traffic. The test samples are received from a remote server and potentially represent malicious attacks against a testing network. Notably, for truly blind testing, embodiments of the testing technique employ a mixture of malware and benign test samples, as well as addressing subterfuge, to prevent the security devices from being able to reliably determine maliciousness of the test samples based on a source of any of the samples.

33 Claims, 5 Drawing Sheets

(56) References Cited

U.S. PATENT DOCUMENTS

| | | |
|---|---|---|
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,505,094 B1 * | 8/2013 | Xuewen ............ H04L 63/1416 |
| | | 707/687 |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |

(56) References Cited

U.S. PATENT DOCUMENTS

| | | | |
|---|---|---|---|
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,021,085 B1* | 4/2015 | Jensen | H04L 51/12 709/219 |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2* | 8/2015 | Aziz | G06F 21/56 |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1* | 4/2016 | Manni | H04L 63/1433 |
| 9,330,258 B1* | 5/2016 | Satish | H04L 63/0236 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,774 B1* | 8/2016 | Liu | H04L 63/1416 |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |

(56) References Cited

U.S. PATENT DOCUMENTS

| | | |
|---|---|---|
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |

(56) References Cited

U.S. PATENT DOCUMENTS

| | | |
|---|---|---|
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0010683 A1* | 1/2008 | Baddour ............ H04L 63/1441 726/24 |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |

(56) References Cited

U.S. PATENT DOCUMENTS

| | | |
|---|---|---|
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0157420 A1* | 6/2014 | Guarnieri ............... G06F 21/562 726/25 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0298460 A1* | 10/2014 | Xue .................... H04L 63/1425 726/23 |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0121526 A1* | 4/2015 | McLarnon ............... H04L 63/14 726/23 |
| 2015/0156203 A1* | 6/2015 | Giura .................... H04L 63/101 726/4 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1* | 9/2016 | Singh .................... H04L 63/20 |
| 2016/0301703 A1 | 10/2016 | Aziz |
| 2016/0330215 A1* | 11/2016 | Gafni ................... H04L 63/14 |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36TH Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.-mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

(56) References Cited

OTHER PUBLICATIONS

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H. , et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines.", ("King"), (2003).

Kreibich, C. , et al., "Honeycomb-Creating Intrusion Detection Signatures Using Honeypots", 2nd Workshop on Hot Topics in Networks (HotNets-11), Boston, USA, (2003).

Kristoff, J. , "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S. , et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham , "Insertion, Evasion, and Denial of Service: Eluding Network Intrusion Detection", Secure Networks, ("Ptacek"), (Jan. 1998).

\* cited by examiner

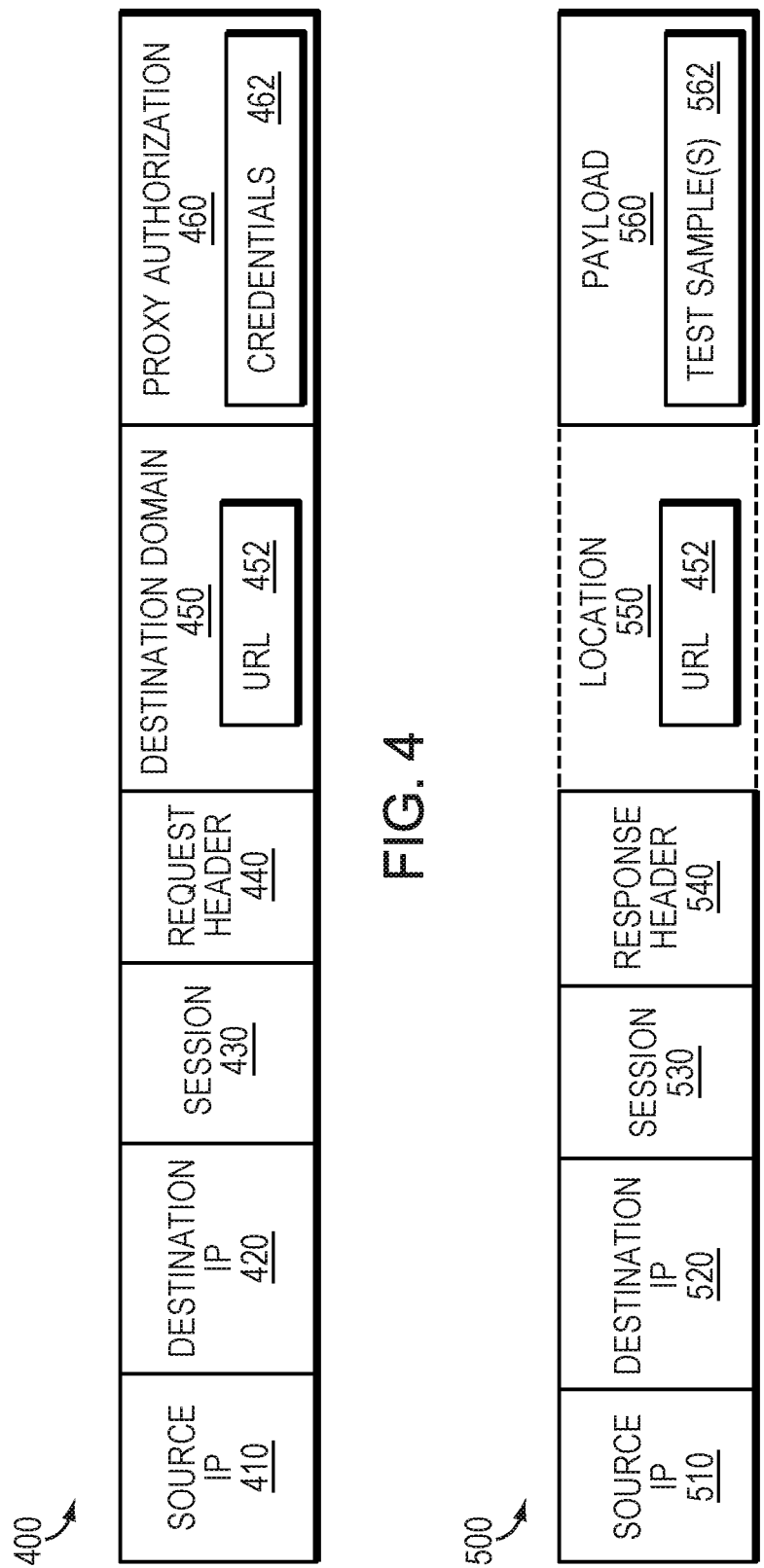

TECHNIQUE FOR MALWARE DETECTION CAPABILITY COMPARISON OF NETWORK SECURITY DEVICES

BACKGROUND

Technical Field

The present disclosure relates to malware detection capabilities of network security devices and, more specifically, to testing and comparing of malware detection capabilities of network security devices.

Background Information

Enterprise network administrators desiring to evaluate commercially available malware detection capabilities of network security devices may often conduct tests to determine efficacy of one or more malware detection solutions of the devices. These tests may be conducted before selection of one of the solutions for purchase or from time to time after solution procurement to assure continued efficacy of malware detection as the threat landscape changes. The testing may require using 'live' malware for realistic and accurate evaluation. As such, it is vital that the testing be conducted safely without the potential to infect the enterprise's own network and its IT infrastructure.

Typically, these tests are conducted by testing commodity (common and well known) malware in the selected malware detection solutions to assess whether the solutions detect the malware. Unfortunately, these tests can produce inaccurate results that do not reveal hidden deficiencies in the real-world malware detection capabilities of the detection solutions. For instance, some of the tested solutions may detect malware attacks based on pre-determined signatures or characteristics, such as whether the attacks match well known virus signatures, or whether they originate from black-listed domains (i.e., domains associated with known malware). Such detection solutions are unlikely to succeed in 'real' use of an actual 'in production' computer network, where the solutions must detect and protect against 'zero day' and other advanced malware.

Zero day attacks, by definition, have not been detected before and thus have no known signatures or known characteristics; accordingly, such signature-based solutions would fail to detect them. Moreover, advanced malware may coopt and use previously whitelisted domains, i.e., domains not previously known to be malicious; accordingly, solutions relying on domain-identification techniques would fail to detect them. Finally, advanced malware is often polymorphic, and thus has signatures and superficial characteristics that change over time while retaining core malicious functions, which, once again, may escape detection by solutions relying on pre-determined information. To accurately assess the effectiveness of malware detection solutions, attacks need to be tested in a manner as consistent as possible with real-world attacks on the enterprise (i.e., private) network including use of advanced malware.

It is often desirable to test detection solutions for other purposes and in other circumstances as well. For example, a detection solution vendor or manufacturer may test new releases or models of its detection solutions against prior releases and models (from the same manufacturer or from different companies) by way of comparison testing and/or to demonstrate enhanced detection capabilities.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 4 is a block diagram of an example request that may be advantageously used with one or more embodiments described herein;

FIG. 5 is a block diagram of an example response that may be advantageously used with one or more embodiments described herein.

OVERVIEW

Figure 1:
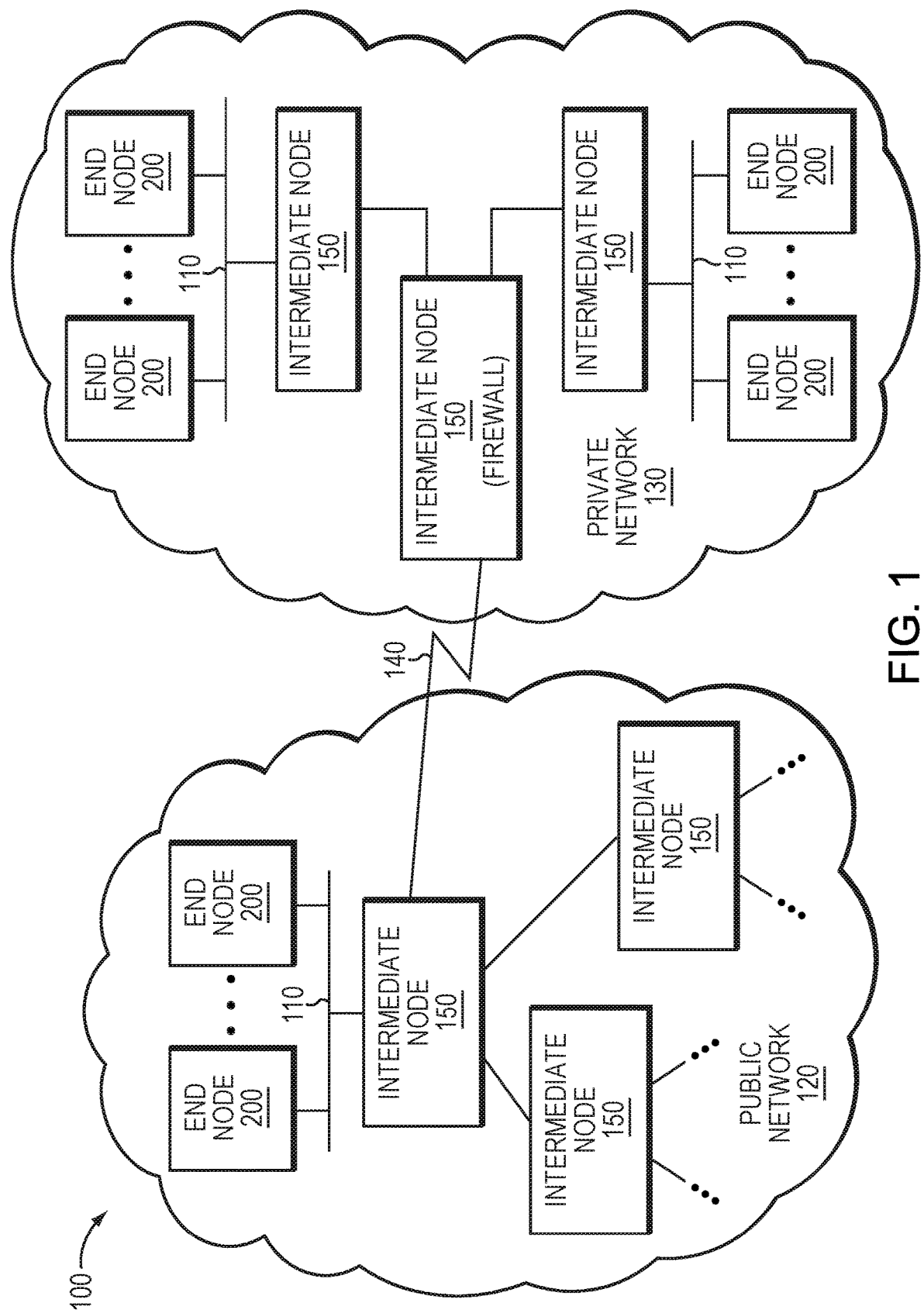
FIG. 1 is a block diagram of a network environment that may be advantageously used with one or more embodiments described herein.

The embodiments herein are directed to a testing technique to test and compare malware detection capabilities of network security devices and other cyber-attack security devices, such as those commercially available from a variety of cyber-security vendors. Testing is conducted on a plurality of test samples in a "blind" fashion, where the security devices do not know beforehand whether the test samples are "live" malware or benign network traffic. The test samples are received from a remote server and potentially represent malicious attacks against a testing network. Notably, for truly blind testing, embodiments of the testing technique employ a mixture of malware and benign test samples, as well as addressing subterfuge, to prevent the security devices from being able to reliably determine maliciousness of the test samples based on a source of any of the samples.

In one or more embodiments, a virtualized endpoint running on a test console, e.g., a computer, connected to the testing network of a testing environment generates and sends one or more request messages (requests) to acquire a plurality (e.g., mixture) of test samples from a database of samples stored in a secure data store of the testing environment. Each request includes an indicator, e.g., a uniform resource locator (URL), of a domain that may or may not be known to be associated with a source of malware. More specifically, the URL's may each correspond to a well-known and common (i.e., "clean" or "whitelisted") domain not generally associated with a malicious server. In other embodiments, the URL's may correspond to a mixture of such whitelisted domains and "dirty" or "blacklisted" domains known to be associated with a malicious server. Illustratively, the request is modified at a proxy of a gateway connected to the testing network to direct the request to a remote server storing the database of samples, while maintaining the URL as an alias domain of the request. The request is forwarded to a switch of the testing network that connects the test console and the security devices to provide communication with the remote server, which may be located external to the testing network and accessed, e.g., via a public network. The switch mirrors (i.e., provides copies of) the request to the security devices, illustratively "units under test" (UUTs), such as one or more malware detection systems, which may be equipped with counter-evasion technology configured to detect malware developed to avoid detection. According to the testing technique, the proxy may be used to obscure source/destination address information of communications (i.e., addressing subterfuge) with the remote server so that simplistic malware detection by, e.g., Internet address blacklisting, is unreliable for the UUTs to detect whether the communication has malware.

The remote server receives and parses each request for credentials to authenticate the virtualized endpoint as entitled to receive one or more test samples indicated in the request. The remote server then returns a response message (response) associated with each request addressed to the virtualized endpoint, wherein the response includes the one or more test samples of the mixture of malicious and benign test samples, each having at least one malware or benign object for processing by the virtualized endpoint. A copy of the response to the request is also provided to each UUT, e.g., via the switch. The virtualized endpoint processes the objects while each UUT performs its own processing of the objects to detect whether the objects are malware or benign. In some embodiments, and depending on the type of UUT being tested, each UUT may monitor and track the request-response message traffic (i.e., both inbound and outbound traffic) flowing between the gateway and remote server. The UUT may attempt, depending on its capabilities, to match the destination address (e.g., URL) of such outbound traffic (e.g., the request message) and/or the source address (e.g., URL) of such inbound traffic (e.g., response message) against a blacklist of known malicious servers. However, any attempt by the UUT to ascribe maliciousness to the alias domain for purposes of Internet address blacklisting of the destination of the request or the source of the response may be ineffective (i.e., unreliable indicator of malware) because of the mixture of malicious and benign objects contained in the response(s) and because of the mixture of clean and dirty alias domains.

During processing by the virtualized endpoint, the object may seek additional content, such as a malicious package not included in the object. The virtualized endpoint may generate further requests to obtain such additional content from one or more network locations, e.g., identified by one or more URLs specified by the object. The UUT may process the object and additional content to determine whether the object and additional content are malicious. Thereafter, each UUT may indicate whether an object (and additional content) is malware or benign.

Based on the reports of the UUTs, the test application issues its own report to compare and contrast detection efficacy of the UUT's. In an embodiment, the report may include information as to whether each UUT correctly identified samples as malicious or benign or incorrectly (i.e., falsely) identified samples as malicious or benign (false positives and false negatives, respectively), as well as a vector (e.g., email, web) used to deliver the sample and a sample type (e.g., object, flow, multi-flow).

DESCRIPTION

FIG. 1 is a block diagram of a network environment 100 that may be advantageously used with one or more embodiments described herein. The network environment 100 illustratively includes a plurality of computer communications networks organized as a public network 120, such as the internet, and a private network 130, e.g., an organization or enterprise network including a testing network (i.e., a network used for testing purposes) or a production environment (i.e., a network used for operation of the enterprise). The networks 120, 130 illustratively include a plurality of network links and segments connected to a plurality of nodes. The network links and segments may include local area networks (LANs) 110 and wide area networks (WANs) 140, including wireless networks, interconnected by intermediate nodes 150 to form an internetwork of nodes, wherein the intermediate nodes 150 may include network switches, routers and/or firewalls. The LANs 110 may, in turn, interconnect end nodes 180 which, in the case of private network 130, may include endpoint devices (endpoints).

In an embodiment, the endpoints may illustratively include, e.g., client/server desktop computers, laptop/notebook computers, process controllers, medical devices, data acquisition devices, mobile devices, such as smartphones and tablet computers, and/or any other intelligent electronic device having network connectivity that may be configured to implement a virtualization system. The nodes illustratively communicate by exchanging packets or messages (i.e., network/message traffic) according to a predefined set of protocols, such as the Transmission Control Protocol/Internet Protocol (TCP/IP); however, it should be noted that other protocols, such as the HyperText Transfer Protocol Secure (HTTPS), File Transfer Protocol (FTP) and various email protocols, may be advantageously used with the embodiments herein. In the case of private network 130, the intermediate node 150 may include a firewall or other network computing device configured to limit or block certain network traffic in an attempt to protect the endpoints from unauthorized users and attacks.

Figure 2:
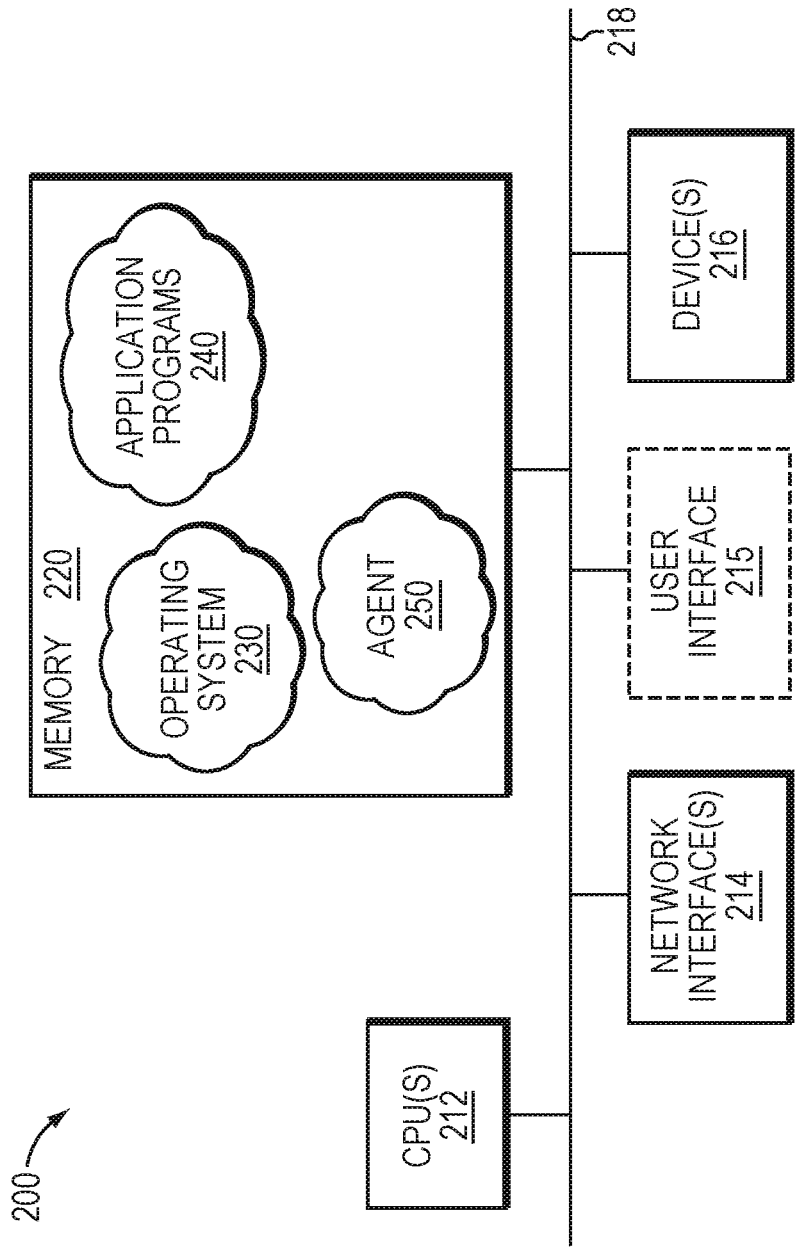
FIG. 2 is a block diagram of an end node that may be advantageously used with one or more embodiments described herein.

FIG. 2 is a block diagram of an end node that may be advantageously used with one or more embodiments described herein. The end node 200 may be illustratively embodied as a test console, a unit-under-test (UUT) including a malware detection system (MDS), and/or a remote server as described further herein. The end node 200 may include one or more central processing units (CPUs) 212, a memory 220, one or more network interfaces 214, one or more devices 216, and (optionally) a user interface 215 connected by a system interconnect 218, such as a bus. The user interface 215 may present a graphical or textual based representation to a user on, e.g., a computer display of the node that enables the user to interact with the node. The devices 216 may include various input/output (I/O) or peripheral devices, such as storage devices (e.g., disks) organized as storage (e.g., data and metadata) repositories of volumes and files embodied as secondary storage. The disks may be solid state drives (SSDs) embodied as flash storage devices or other non-volatile, solid-state electronic devices (e.g., drives based on storage class memory components), although, in an embodiment, the disks may be hard disk drives (HDDs). Each network interface 214 may contain the mechanical, electrical and signaling circuitry needed to connect the node to the network 130 to thereby facilitate communication over the network. To that end, the network interface 214 may be configured to transmit and/or receive messages using a variety of communication protocols including, inter alia, TCP/IP and HTTPS.

The memory 220 may include a plurality of locations that are addressable by the CPU(s) 212 and the network interface(s) 214 for storing software program code (including application programs 240 and, as described below for one or more embodiments of a virtualized endpoint of the test console, an agent 250) and data structures (e.g., data logs), not shown, associated with the embodiments described herein. The CPU 212 may be embodied as a hardware processor including processing elements or logic adapted to execute the software program code and application programs, and manipulate the data structures. Exemplary CPUs may include families of instruction set architectures based on the x86 CPU and the x64 CPU. An operating system 230, portions of which are typically resident in memory 220 and executed by the CPU, functionally organizes the node by, inter alia, invoking operations in support of the software program code and application programs 240 executing on the node. Illustratively, the software program code may be implemented as processes of the operating system 230. As used herein, a process is an instance of software program code (e.g., an application program 240) executing in the operating system that may be separated (decomposed) into a plurality of threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code and application programs stored in memory, alternative embodiments also include the code/programs being embodied as modules consisting of hardware, software, firmware, or combinations thereof.

The embodiments herein are directed to a testing technique to test and compare malware detection capabilities of network security devices and other cyber-attack security devices, such as those commercially available from a variety of cyber-security vendors. Testing is conducted on a plurality of test samples in a "blind" fashion, where the security devices do not know beforehand whether the test samples are "live" malware or benign network traffic. The test samples are received from a remote server and potentially represent malicious attacks against a testing network. Notably, for truly blind testing, embodiments of the testing technique employ a mixture of malware and benign test samples, as well as addressing subterfuge, to prevent the security devices from being able to reliably determine maliciousness of the test samples based on a source of any of the samples.

The malware may be of any level of sophistication, from commodity malware (such as computer viruses, worms, Trojans, or spyware) to advanced malware. As used herein, advanced malware may be of any type of sophisticated malware, such as (i) zero day malware that have not been previously detected and thus have no known signatures or characteristics; (ii) polymorphic malware that changes its appearance or behavior, including its signature, over time while retaining its core malicious functions, thus avoiding matches against a signature database; and/or (iii) targeted malware that targets a particular user or node on an enterprise network and that may not match signatures of known common malware. The advanced malware may be contained for example in a single downloaded webpage or email, or may be delivered in multiple stages such as a downloaded webpage or email including a link (URL) to a downloadable malware package. Moreover, the advanced malware may have built-in evasion technology configured to detect whether it is being processed in a detection environment and, if so, deactivate or postpone activation (hibernate) to avoid detection. Accordingly, in order to detect malware reliably, the malware detection systems may be configured with capabilities to detect advanced malware even if delivered in multiple stages while avoiding triggers (e.g., events) that may cause the malware to evade detection.

Figure 3:
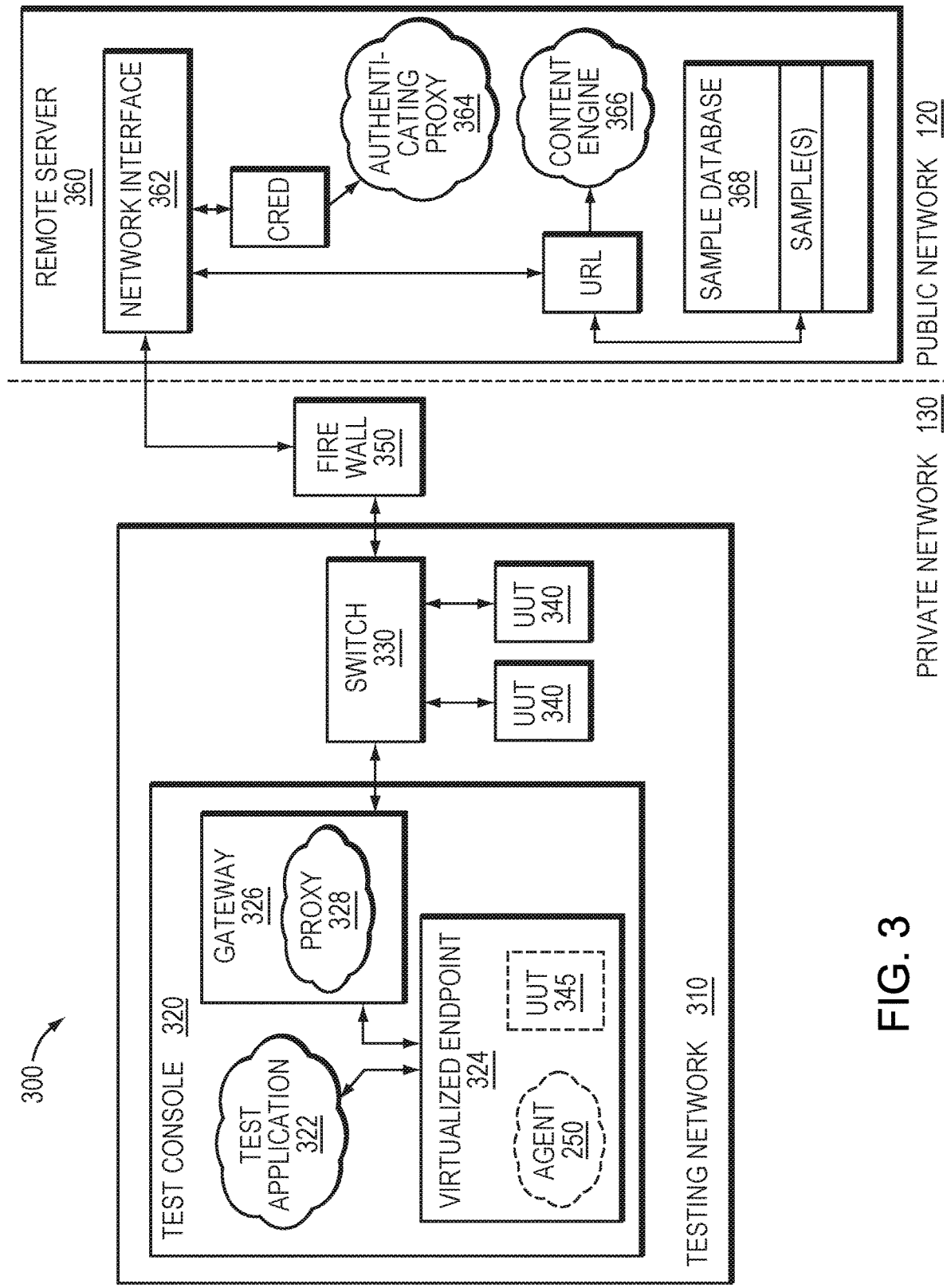
FIG. 3 is a block diagram of a testing environment that may be advantageously used with one or more embodiments described herein.

FIG. 3 is a block diagram of a testing environment 300 that may be advantageously used with one or more embodiments described herein. A testing network 310 of the testing environment 300 may include a test console 320, a switch 330, and one or more network security devices whose efficacy of detecting the malware is to be assessed, i.e., the security devices are tested to determine whether they can accurately detect (i.e., demonstrate capacity to descry) the malware and/or malicious behavior. The testing network 310 is illustratively embodied as an isolated network within the private network 130, such that any malware received is contained within (i.e., restrained to) the testing network. As will be understood by persons of skill in the art, other network arrangements may be used, such as virtual LANs (VLANs), to deploy the testing network as an isolated network. The test console 320 may be implemented as a laptop or other computer system controlled by a test administrator. The security devices are illustratively "units under test" (UUT's 340), e.g., network traffic capture devices coupled locally and communicating with one or more local or remote malware detection systems (MDS's). The UUT's 340 may employ any type of malware analysis, including static (for example, signature detection or heuristics) and/or dynamic (behavioral) analysis, for detection, and may or may not be equipped with counter-evasion technology configured to detect malware developed to avoid detection.

The switch 330 connects the test console 320 and the UUT's 340 to provide communication with the remote server 360, which may be located external to the testing network 310 and accessed, e.g., via the public network 120. The switch 330 may be, for example, hardware or a virtual switch provided by executable software of the test console 320. In alternative embodiments, though not shown in detail, it will be understood that the testing network 310 and the remote server 360 may be located in the same private network (e.g., in separate sub-networks of a single private network of an enterprise), or in separate private networks (e.g., first and second private networks of first and second enterprises, respectively) coupled together by a communication link such as a public network (e.g., the Internet), or the testing network may be in a private network and the remote server may be hosted in a public network. The switch 330 may be located operationally directly behind a firewall 350, router or other network device of the testing network 310 and may include logic (e.g., one or more mirroring ports) equipped to copy incoming packets (messages) received by the testing network 310 from the remote server 360, and provide the incoming messages (copies) to the test console 320 and each UUT 340. In an alternative embodiment, a UUT, such as anti-virus software or a detection agent (e.g., of the type described with respect to agent 250), may be included in the virtualized endpoint 324 to facilitate testing of endpoint-based malware detection, as described further herein.

In an embodiment, the MDS may be included within a special-purpose, malware detection appliance or a component in a general purpose computing device. As used herein, an appliance may be embodied as any type of general-purpose or special-purpose computer, including a dedicated electronic computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The MDS may be available via a local network connection or remotely through the internet. The MDS may include static analysis logic that may identify suspicious or malicious characteristics of an object, statically (operable without executing the object). Additionally, the MDS may utilize dynamic analysis logic to process suspicious objects in an instrumented (i.e., monitored), virtual machine capable of detecting behaviors of the suspicious objects during processing. The dynamic analysis logic may be configured with (and run) an operating system and one or more applications (collectively, a "software profile") that the suspicious object may expect or need for effective processing. That is, the software profile may include the same type of software that runs on the virtualized endpoint to execute the object. By so doing, the software environment in which the virtualized endpoint monitors the suspicious behaviors may be replicated in the software profile run on the virtual machine of the MDS. In this way, object behaviors that may be exhibited only in the presence of those applications may be detected. In another embodiment, the software profile may include a different type of software (e.g., different vendor or version) that runs on the virtualized endpoint to execute the object, to determine the presence of malware within a different runtime environment, or plural software profiles (for example, the same and different from that run on the endpoint). The MDS may also include a component that may combine the results of the static and dynamic analyses to classify the object as malicious or benign.

The test console 320 may be configured with a test application 322, a virtualized endpoint 324 and a gateway 326. The test application 322 runs on the test console 320 to permit the test administrator to select from a database of test samples (one or more malicious or benign objects) available from the remote server 360. For instance, the test administrator may be presented with a list of test samples on the computer display (user interface 215) of the test console from which to choose by selecting, e.g., via mouse click, one or more identifiers associated with one or more samples and submitting the identifiers as part of a request message (request). Illustratively, the test administrator may select an identifier associated with an individual malicious or benign sample, or an identifier associated with a predetermined mixture of malicious and benign samples. Each identifier may be a domain or uniform resource locator (URL), which has a one-to-one (1:1) association with the sample or mixture of samples. The URL's may each correspond to a well-known and common (i.e., "clean" or "whitelisted") domain (e.g., Microsoft.com or Google.com) which, while not likely to have been blacklisted as a malicious server, may nonetheless have been hijacked and used to download malware. In other embodiments, the URL's may correspond to a mixture of such whitelisted domains and "dirty" or "blacklisted" domains known to be associated with one or more malicious servers. In an embodiment, the administrator may be presented with one or more test suites having a pre-arranged selection of test samples (e.g., a pre-arranged selection of malicious and benign test samples) arranged according to a level of test sophistication designed to measure detection capabilities of the UUTs (e.g., percentage of samples correctly detected as benign or malicious).

The test application 322 may instantiate (which should be read to include causing the instantiation of) the virtualized endpoint 324 as a virtual machine running on the test console 320 to simulate one or more actual endpoints on the enterprise network that may be vulnerable to the malware. The virtualized endpoint 324 of the test console 320 thus serves as a "victim" node for the test samples, while providing for safe, "sandboxed" processing. Additionally, by simulating an actual endpoint, the virtualized endpoint 324 may effectively simulate a "normal" computer network node, and thus serve to counter (e.g., suppress) evasion technology of advanced malware. To that end, the virtualized endpoint 324 may serve as a source of one or more requests for the samples, i.e., mimicking a "real" endpoint, configured to generate and send each request to a destination intended by the URL of the request, but which is redirected by the gateway 326 to the remote server 360. In this regard, the virtualized endpoint 324 may initiate establishment of a communication session with the remote server 360 (via the gateway 326) to acquire the sample, e.g., an advanced malware sample. The advanced malware sample may be a single object or a group of related objects (e.g., messages) organized as a flow during a single communication session between the virtualized endpoint 324 and the remote server 360 or as a set of flows (multi-flow attack). A multi-flow attack is a coordinated strike delivering various objects (including at least one malicious object) over multiple stages and multiple flows, sometimes across multiple vectors. Many commercially available cyber-security solutions analyze these stages separately; unfortunately, they may appear benign when viewed independently, limiting the security solutions' ability to detect multi-flow attacks. Better cyber-security solutions can detect and analyze the totality of a multi-flow attack, recognizing and correlating the related flows. For instance, a request may be initiated (generated) by the virtualized endpoint 324 and include the URL (identifier) as an alias domain. The remote server 360 may provide the response to the request in one or more response messages containing an object, a flow or set of flows, during a same communication session (in the case of an object or flow) or during a set of communication sessions (in the case of a multi-flow attack). In response to a further request from the virtualized endpoint 324 for additional content, as described elsewhere herein, the remote server may provide additional responses. UUT's equipped to detect multi-flow attacks are typically designed to capture all the related flows, and delay completion of processing for malware detection until they are received and can be processed together.

In some embodiments, the test application 322 may generate a request seeking a single malware sample, which is associated with not one but two (or more) URLs. These may include a first URL associated with a known (i.e., previously determined) malicious webserver and thus quite likely contained in an address blacklist of an UUT, and a second URL having a well-known and common domain not known to be associated with a malicious server and thus not likely blacklisted. A response to the request may include a first copy of the malware served with the first, known malicious URL, and a second copy of the malware served with the second, misleadingly benign appearing URL to enable the employment of addressing subterfuge in accordance with the testing technique described herein. This enables testing of the capability of the UUT's to detect advanced malware, as will be describe in greater detail below.

The gateway 326 may be embodied as a translation application (redirecting the request to the remote server) running in another (i.e., second) virtual machine of the test console 320. Alternatively, the gateway may be embodied as a node within the testing network. Illustratively, the gateway 326 intermediates requests and responses (message traffic) between the virtualized endpoint 324 and the remote server 360 for the communication session or sessions), and, to that end, redirects that message traffic to the remote server 360 and virtualized endpoint 324 as appropriate. In one or more embodiments, e.g., using the HTTPS protocol, the communication session is illustratively established between the gateway 326 and the remote server 360, and the virtualized endpoint 324 communicates with the gateway 326 via an internal connection (e.g., a virtualized bridge) within the test console 320. Accordingly, the gateway serves as a source device for the request-response message traffic for the communication session. In an embodiment, the gateway may act as a protection layer adapted to harden the testing network by restricting (e.g., filtering) communication according to a specific configuration. That is, the gateway may be configured, e.g., via one or more firewall rules, to limit communication (e.g., allow only specific protocols, such as HTTPS/HTTP), to be exchanged with the test console so as to prevent malicious message traffic using unrecognized or custom protocols that are often employed by malware. Illustratively, if the message traffic occurs in accordance with a custom communication protocol, such communication may or may not be allowed.

In order to mimic real-world attack scenarios that often include advanced malware designed to avoid detection by unsophisticated malware detection solutions, such as Internet address blacklisting of malicious domains (relied on by many commercially available malware detection technologies), the testing technique employs addressing subterfuge on the request (packet) using one or more proxies embodied as proxy software 328, such as the Squid proxy software available as open source from www.squid-cache.org. The proxy may be used to obscure source/destination address information of communications (i.e., addressing subterfuge) with the remote server 360 so that simplistic malware detection by, e.g., Internet address blacklisting, is unreliable for the UUT's 340 as is the case in many real-world scenarios. Illustratively, an instance of the proxy software 328 may be employed and executed at the gateway 326 of the test console 320 to modify request packet information (headers) so that the request is re-directed to the remote server 360 for response rather than the URL (alias domain) contained in the request. That is, an original Internet address (e.g., IP address) of the request associated with the URL is altered (modified) to an Internet address of the remote server, thus re-directing the request to the remote server. For example, the gateway 326 may receive a request (e.g., get HTTPS request message) from the virtualized endpoint 324 that specifies a well-known and common URL as the alias (destination) domain of the request and the gateway (proxy software 328) may modify an appropriate header of the request to direct the request to the remote server 360.

FIG. 4 is a block diagram of an example request 400 that may be advantageously used with one or more embodiments described herein. The request 400 may include a plurality of header fields, such as a source (IP) address field 410, a destination (IP) address field 420, a session field 430, a request header field 440, a destination domain field 450 and a proxy-authorization field 460. In an embodiment, the source IP address field 410 contains the IP address of the gateway 326, the destination IP address field 420 contains the IP address of the remote server 360 (as modified by the proxy software 328), and the session field 430 contains an identifier (e.g., session id) that identifies the communication session for the request-response message traffic between the gateway 326 and remote server 360. The request header field 440 contains an identifier (e.g., a request id) that identifies the message as a request and the destination domain field 450 contains the URL 452 of the alias domain. As noted, the URL 452 also has a 1:1 (one-to-one) association with the requested test sample or samples. The request may also include a proxy-authorization field 460 that contains security credentials 462 (e.g., password, passcode) used to authenticate the recipient (e.g., virtualized endpoint) as entitled to receive the requested test sample or samples.

Referring again to FIG. 3, the remote server 360 includes a network interface 362, an authenticating proxy 364, a content engine 366 and sample database 368. The network interface 362 may receive and parse the request 400, which specifies the IP address of the gateway 326 as the source of the request, the IP address of the remote server 360 as the destination of the request, and the URL 452 of the requested test sample or samples. The credentials 462 of the parsed request are provided to the authenticating proxy 364 to authenticate the virtualized endpoint as entitled to receive the requested test sample or samples. One or more portions of the URL 452 (identifier) is provided to the content engine 366 and used as an index to obtain the requested sample or predetermined mixture of samples from the sample database 368 (e.g., a secure data store), wherein each sample or predetermined mixture of samples in the database 368 is associated with a different identifier. The content engine 366 provides the requested test sample or samples to the network interface 362 of the remote server, which generates (creates) a message for "serving" the sample or samples to the virtualized endpoint as a response to the request (and, in so doing, delivering the sample or samples to the UUT's).

In an embodiment, the content engine 366 may also retrieve from the sample database indicators of compromise (IOC's) (e.g., behavioral features) associated with the test sample or samples, e.g., in response to selection of the URL by the test administrator. The IOC's may be sent to the test application 322 in a message separate from the sample or samples, whether proximate in time to the message containing the sample or samples or at a later time, such as during testing of the samples by the UUTs. IOC's received by the test administrator may be pre-determined from previous monitoring (i.e., observed behavior) of the associated test samples in an environment similar to that of the endpoint. As such, the IOC's represent expected behaviors of the test samples that indicate compromise (i.e., identify potentially malicious activity) of an endpoint. The purpose and use of the IOC's are described below.

FIG. 5 is a block diagram of an example response 500 that may be advantageously used with one or more embodiments described herein. The response 500 includes a plurality of header fields, such as a source (IP) address field 510, a destination (IP) address field 520, a session field 530, a response header field 540, and an (optional) location field 550, as well as a payload field 560. In an embodiment, the source IP address field 510 contains the IP address of the remote server 366, the destination IP address field 520 contains the IP address of the gateway 326, and the session field 530 may contain the session id of the communication session. The response header field 540 contains the request id of the request corresponding to the response message, the optional location field 550 may contain the URL 452 of the alias domain, and the payload field 560 contains the requested test sample or samples 562. As will be understood by persons of skill in art, a plurality of responses 500 may be sent to convey an entire sample or samples 562 and, in some embodiments, the sample or samples may be conveyed as email attachments and via a variety of other protocols, such as file transfer protocol (FTP).

Referring again to FIG. 3, the virtualized endpoint 324 may be instantiated by the test application 322 as a virtual machine provisioned with a software profile that includes, e.g., an operating system and one or more application programs, such as a web browser, email application, and/or a document reader, configured to receive samples/objects and associated metadata for processing. Processing by the virtualized endpoint 324 may include opening the object in an appropriate application, e.g., the web browser if the object is a URL of a webpage or the document reader if the object is a document. During processing by the virtualized endpoint, the object may seek additional content, such as a malicious package (e.g., an executable javascript) not included in the object. The virtualized endpoint 324 may generate further requests to obtain such additional content from one or more network locations, e.g., identified by one or more URLs specified by the object. Notably, the generated requests (and responses) are subject to the modification of packet information by the gateway 326, as described above. That is, the requests for additional content may be re-directed to the remote server via the gateway proxy software 328. Moreover, the additional content is mirrored (copied) to the UUT's 340 and available to them for detection of malware.

In those cases in which IOC's associated with a sample/object are received from the content engine 366, upon completion of processing by the virtualized endpoint 324, the test application 322 may inspect (e.g., scan) the virtualized endpoint using observed IOC's of the objects to determine whether the virtualized endpoint was compromised or not. In some embodiments, the test application 322 can cause an endpoint detection agent 250 (FIG. 2) of the virtualized endpoint 324 to report observed IOC's (behaviors) monitored during processing of the object within the virtualized endpoint 324 to the testing application for comparison with the IOC's received from the content engine. Behaviors observed in the virtualized endpoint 324 matching behaviors of the IOC's received from the content engine 366 may indicate that the object has compromised the virtualized endpoint 324 and thus constitutes malware. Moreover, the UUTs that perform behavioral detection can reasonably be expected to see the same or similar IOC's (behaviors) as exhibited in the virtualized endpoint 324 and/or received from the remote server, particularly if the UUT's are provisioned and run the same type of software as the virtualized endpoint 324. Any failure on the part of one or another of the UUT's to so detect those behaviors (i.e., failure to detect the received IOC's or observed IOC's at the endpoint) can be reported by the test application 322 as reflecting on efficacy in detection. In other words, the IOC's (i.e., received or observed at the endpoint) may serve as a baseline of behaviors expected to be observed by the UUTs (and virtualized endpoint) during their processing of malicious samples/objects, and the efficacy of the UUT's may be measured by comparing the behaviors (e.g., IOC's) monitored during processing of each object within the endpoint (or IOC's provided by the content engine) with those detected by each of the UUT's. Notably, the received IOC's may serve as a baseline of behaviors expected to be observed by the virtualized endpoint, so as to verify observation of those expected behaviors at the endpoint by comparing the baseline behaviors with the behaviors monitored during processing of each object within the endpoint. When the test application 322 reports on the efficacy of the UUT's, it may report on those IOC's not detected by the UUT's (if any), which may present a compelling differential in performance of the UUT's in detecting malware. That is, the IOC's may be used as a metric for determining the efficacy of the UUTs in detecting malware. As such, the IOC's are not used to assist the UUT's in detection of malware.

In one or more embodiments, in order to monitor for behaviors during processing of an object within the virtualized endpoint 324, the virtualized endpoint includes an endpoint detection agent 250 (FIG. 2). The agent 250 (shown in dashed lines in FIG. 3) is an executable software component configured to monitor the behavior of the application programs 240 and/or operating system 230. The agent 250 may be configured to monitor and store metadata (e.g., state information, memory accesses, process names, time stamp, etc.) associated with content executed at the virtualized endpoint 324 and/or behaviors (sometimes referred to as "events") that may be associated with processing activity. Events are behaviors of an object that are exhibited by processes executed by the virtualized endpoint 324 and are monitored by the agent 250 during the normal operation of the virtualized endpoint. Examples of these events may include information associated with a newly created process (e.g., process identifier, time of creation, originating source for creation of the new process, etc.), information about the type and location of certain data structures, information associated with an access to certain restricted port or memory address, or the like. The agent 250 may also retrieve and communicate, e.g., from the virtualized endpoint to a remote electronic device, context information such as the contents of the virtualized endpoint's memory or hard drive. In some embodiments, the agent 250 may include event processing and filtering logic which, for example, applies heuristics, rules or other conditions to the monitored behaviors, to identify anomalous or unexpected behaviors and determine if the object is suspicious. The processing and filtering logic, in some embodiments, may scan content being processed for matches with indicators (signatures). Also, in some embodiments, the agent 250 may include a classifier configured to classify the behaviors as suspicious or even malicious. The behaviors detected and classification of the object made by the agent 250 may be provided to the test application 322 for comparison with the received IOCs and with the results (e.g., observed IOC's) of the UUT's.

Illustratively, the UUT's 340 are configured to receive the copied content, e.g., receive the one or more objects and additional content (e.g., messages) from the switch 330 and process the objects and additional content in normal operation to determine whether the objects and additional content are malicious. In typical commercially-available malware detection systems, the UUT's 340 may treat the additional objects as new objects for separate analysis or may treat them as objects related to objects from a prior flow for analysis as part of a potential multi-flow attack.

Some commercially-available malware detection systems may be adapted (provisioned) to submit cyber-security alerts with details regarding malware detections (and other results) to a conventional third-party or open source data aggregation product such as a SIEM (Security Information and Event Management). The aggregation product can often collect, analyze, index and correlate such real-time data in a searchable repository for later presentation to users/consumers. The virtualized endpoint of the present embodiments may be equipped with an application program interface for at least one such data aggregation product. When any of the UUT's attempts to issue alerts by sending the alert data out over the testing network, the switch provides the alert data to the virtualized endpoint, which is then processed by the test application to extract the detection information contained in the data for use in comparison of detection results from the UUT's. The alert data typically is not communicated outside the testing network.

It should be noted that FIG. 3 depicts the UUT's 340 in a non-blocking or "out-of-band" deployment, in which the switch 330 mirrors (copies) traffic received over the firewall 350 to both of the UUT's 340 and provides the traffic to the test console 320. This deployment is non-blocking since any objects included in the traffic found to be malicious cannot be prevented by the UUT's from reaching the virtualized endpoint 324. An alternative, "in-band" deployment, can locate one or another of the UUT's in series with the switch, and between the firewall 350 and the test console. Upon detecting (rightly or wrongly) a malicious attack (including communications containing or associated with suspected malware), the in-line UUT 340 may be configured to block the communication (e.g., request-response message traffic). For example, the in-line UUT 340 may determine that a request message is directed to a blacklisted domain (the alias domain) and therefore block the request, or determine that the response message containing the sample is being sent from a blacklisted domain (the alias domain), and otherwise allow the traffic to proceed. In embodiments or test configurations where the traffic is blocked and yet the samples are benign, the testing results may show that the UUT in question reported a false positive (i.e., wrongly identifying the sample as malware) and, where the UUT relied solely on such reputation testing of the alias domain and the traffic was passed and yet the sample was malware, the testing results may show that the UUT in question reported a false negative (i.e., wrongly identifying the sample as benign). In order to test both UUT's 340 in in-line deployment, it can be readily understood that two tests may need to be performed to determine whether the two "blocking" UUT 340 detect the object as malicious or benign (i.e., "one at a time" testing) or, in the alternative, only one UUT may be deployed in-line and the other deployed out-of-band.

In the case of a multi-flow attack wherein the UUT's may detect and block a particular stage or flow of the multiple related flows, the test application 322 may analyze logs of the gateway 326 to determine whether other stages or flows of the multiple related flows may have bypassed (i.e., failed) detection by the UUT's and reached the console. Where any of the other stages or flows did manage to avoid detection, the test application 322 can report such detection failure as part of its UUT's efficacy assessment.

Each UUT may track (receive) the request-response message traffic between the gateway 326 and the remote server 360, which maintains the URL as the alias domain (source or destination, as the case may be) or, depending on the embodiment, just the response message traffic to the gateway 326 from the remote server 360, which maintains the URL as the alias domain (source). In other embodiments, the UUT may track the session id of the communication session for the request-response message traffic or the source IP address of the request/response which maintains the alias domain as the URL destination/source, respectively. However, any attempt by the UUT to ascribe maliciousness to the source domain or source IP address for purposes of Internet address blacklisting of the source of the response (and similarly for the request message) may be ineffective (i.e., unreliable indicator of malware) because of the mixture of malicious and benign objects contained in the response. In essence, the testing technique measures whether processing by the UUT is performed on the objects contained in the payload of the response rather than on the address information contained in the header fields of the request and/or response. That is, malware detection techniques employed by UUT's that rely largely on header metadata information (e.g., source and destination IP addresses 410, 420, 510, 520, as well as session ID 430, 530 and URL 452) in the request/response may be revealed by the testing technique in the form of a higher percentage of false positive and false negative malware detection scores versus malware detection techniques that analyze the response payload.

The UUT's 340 may issue reports/alerts as to their findings and results, which may be transmitted to the test application 322 of the test console 320. The test application 322 may assess the reported results, and determine the efficacy (e.g., a malware detection score) of each UUT 340 in correctly determining whether the received objects of the samples 542 are malicious or benign. The test application 322 may also present the results of the UUT's analysis in more detail, including the characteristics and behaviors observed for each sample, on which the malware determination is based. The test application 322 may generate a report on the efficacy and comparison of detection results of the UUTs (including, for example, where applicable, behaviors of the samples observed during their execution by the UUTs). This report may be presented to a user or administrator via the user interface 215 on the console's computer display. In an embodiment, the report may include information as to whether the UUT's 340 falsely identified samples as malicious and benign (false positives and false negatives, respectively), as well as the vector (e.g., email, web) used in an attack and a sample type (e.g., object, flow, multi-flow). The report may also include information with respect to a level of sophistication of malware in the samples.

Figure 6:
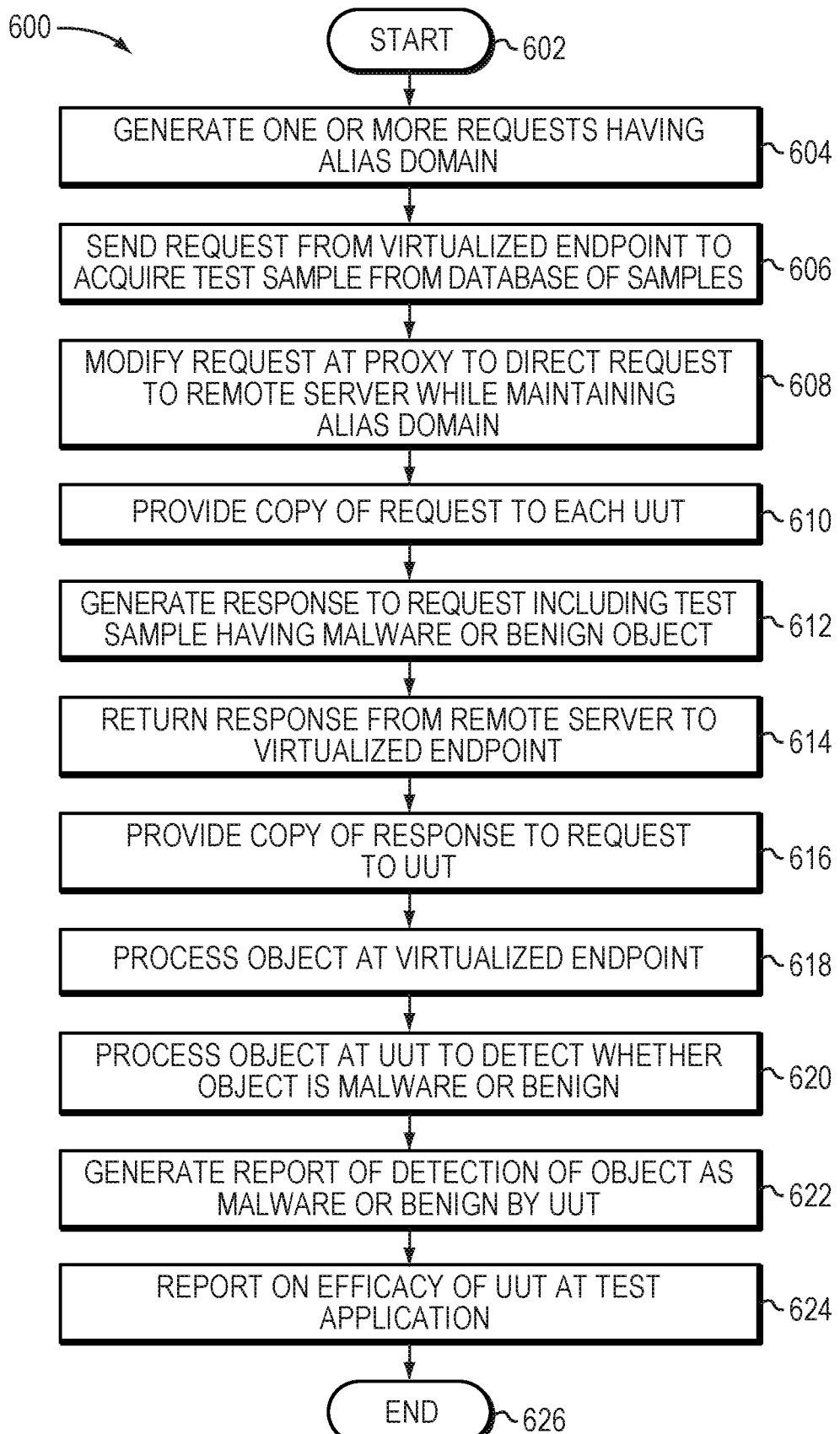
FIG. 6 is an example simplified procedure for testing and comparing malware detection capabilities of network security devices that may be advantageously used with one or more embodiments described herein.

FIG. 6 is an example simplified procedure for testing and comparing malware detection capabilities of network security devices that may be advantageously used with one or more embodiments described herein. The procedure 600 starts at step 602 and proceeds to step 604 where the virtualized endpoint running on the test console (test computer) generates one or more requests to acquire the plurality of test samples, wherein each request includes an indicator of an alias domain (e.g., URL) that may or may not be associated with a source of malware. At step 606, the virtualized endpoint sends the request to acquire the test sample or samples from a database of samples. At step 608, the request is modified (e.g., the IP address of the request is altered) at a proxy, e.g., of the gateway, to direct the request to the remote server while maintaining the indicator, e.g., URL, as the alias (destination) domain of the request. The request is then forwarded to the remote server via the switch where, at step 610, in some embodiments, a copy of the request is provided to each UUT configured as a network security device.

At step 612, a response to the request is generated at the remote server, wherein the response includes the test sample or samples, each having at least one malware or benign object. The response may include, for example, a test sample or samples in the form of a webpage to be opened by a web browser on the virtualized endpoint. In some embodiments, the response may include, for example, a sample or samples in the form of an email or email attachment, in which an embedded URL may link to malware or benign content, and the UUT's must simulate user interaction to cause the embedded URL to be activated. At step 614, the response is returned to the virtualized endpoint via the switch where, at step 616, a copy of the response to the request is provided to each UUT. At step 618, each object included in the response is processed at the virtualized endpoint and, at step 620, in this embodiment, each UUT also processes (e.g., runs static and/or behavioral analysis) the object (e.g., a copy thereof) to detect whether the object is malware or benign. As noted, in some embodiments, each UUT may track the request-response message traffic between the virtual endpoint and remote server which maintains the alias domain for the response. However, any attempt by the UUT to ascribe maliciousness to the alias domain for purposes of Internet address blacklisting of the destination address of the request message or the source address of the response may be ineffective (i.e., unreliable to detect malware) because of the inclusion of a malicious or benign object contained in the response and, in other embodiments (or test configurations), the use of both clean and dirty alias domains that bear no relationship for purposes of the testing to whether the samples are malware or benign.

At step 622, each UUT generates a report of detection of the object as malware or benign. At step 624, the test application can report on the efficacy of the UUT's by comparing and contrasting the detections of the UUT's as reported in step 622. The report of the test application can be provided (generated) by a computer display or other human-readable (e.g., graphical and/or textural) or machine-readable output of the user interface 215 of the test console 320. As noted above, a malware sample can be associated with not one but two URLs, including a first URL recognizable as associated with a known malicious webserver and thus quite likely contained in an address blacklist, and a second URL not known to be associated with a malicious server and thus not likely blacklisted. Where one of the UUT's, for example, only detects the former case of the known malicious server, the report of the test application may expose the deficiency of that UUT with regard to detection of advance (e.g., zero-day) malware for which no preexisting blacklist entry can exist. Moreover, in some embodiments, the report of the test application may include information regarding the ability of the UUT's to detect the IOC's as provided by the content engine and/or as experienced by (and monitored in) the virtualized endpoint during processing of the object. The procedure ends at step 626.

While there have been shown and described illustrative embodiments of the invention, it is to be understood that various other adaptations and modifications may be made within the spirit and scope of the invention. For example, embodiments have been shown and described herein with relation to comparing the detection capabilities of the various commercially available solutions intended to be deployed as network security devices at the periphery of networks, as shown for UUT's 340 of FIG. 3. However, aspects of the invention in their broader sense are not so limited and may, in fact, allow for evaluating the malware detection capabilities one or more UUT's 345 deployed within a virtualized endpoint (where one is shown as a dashed box in FIG. 3). To that end, the testing technique may be conducted as described above with the virtualized endpoint processing the test samples received from the remote server, while running at least one cybersecurity security solution as the UUT 345 (or, in some testing configurations, plural endpoint-located UUT's) within the virtualized endpoint itself.

For example, each UUT 345 within the virtualized endpoint may be a convention anti-virus program that scans incoming network traffic against a database of signatures or another type of endpoint detection agent that monitors processes behaviors for indicators of compromise of the virtualized endpoint, and generate alerts. Each endpoint-located UUT 345 may be evaluated and compared against another endpoint-located UUT (not shown) or against one or more UUT's 340 located outside the virtual endpoint, as shown in FIG. 3. Where plural endpoint-located UUT's are to be tested, they may be installed in the same virtualized endpoint or in different (separate) virtualized endpoints, each instantiated by the test application and provisioned with a different anti-virus or other agent. The agents can be run concurrently (in a time overlapping fashion) or sequentially within the same virtualized endpoint or in separate virtualized endpoints. It can be understood that, in some embodiments involving strictly endpoint-located UUT's and/or in-band UUT's, the switch 330 is not required to provide a mirrored copy to a UUT external to the virtualized endpoint. Where plural endpoint-located UUT's are tested, the switch 330 can take the form of a virtual switch implemented as executable software within the virtual endpoint or separately, e.g., outside the virtual endpoint through within the test console.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments.

What is claimed is:

1. A method comprising:
generating and sending, by a virtualized endpoint that is operating within a test console being part of a testing network, one or more requests to acquire a plurality of samples from a remote server, each request having a uniform resource locator (URL) indicating a domain;
modifying, at the test console including a hardware processor and a memory each generated request to redirect the request to the remote server and obscure address information associated with the request to render ineffective malware detection through address blacklisting by one or more units under test (UUTs) while maintaining the URL of the request as an alias destination domain;
receiving a response to each request by the virtualized endpoint, wherein a copy of the response being redirected to each of the one or more UUTs and the response including one or more samples, each sample including an object; processing the object for each of the one or more samples at the virtualized endpoint and at each of the one or more UUTs to detect whether the object is either malicious or benign; and generating a report to compare and contrast detection efficacy of the UUTs in correctly identifying each of the objects.

2. The method of claim 1 wherein the alias destination domain corresponds to a domain that is known to be associated with a source of malware.

3. The method of claim 1 wherein the remote server is communicatively coupled to the endpoint over a public network.

4. The method of claim 1 wherein the modifying of each generated request comprises:
modifying a header of each request to include an internet protocol (IP) address of the remote server.

5. The method of claim 1 wherein the plurality of samples includes a mixture of objects identified as benign and objects identified as malicious; and wherein maintaining the URL of the request as the alias destination domain further renders malware detection by the one or more UUTs by source address blacklisting ineffective.

6. The method of claim 1 further comprising:
receiving the response by a switch;
sending, by the switch, the response to the endpoint and a copy of the response to each of the one or more UUTs.

7. The method of claim 1 further comprising:
running the endpoint in a first virtual machine on the test console operating as a test computer; and
running a proxy in a second virtual machine on the test console, the proxy modifying each generated request.

8. The method of claim 7 further comprising:
determining whether the endpoint in the first virtual machine is compromised by using indicators of compromise that are one of received from the remote server and generated by an agent executing on the endpoint.

9. The method of claim 1 further comprising:
filtering the request using a rules-based gateway to protect a production network coupled to the testing network.

10. The method of claim 1, further comprising:
operating a gateway to control outbound communication triggered by processing the object by allowing only select communications to be sent over a public network from the endpoint.

11. The method of claim 1 further comprising:
authenticating the endpoint at the server as entitled to receive the plurality of samples indicated in the one or more requests, and wherein a sample database being stored at the remote server to maintain the plurality of samples.

12. The method of claim 1 further comprising:
using one or more portions of the URL as an index to obtain the one or more samples from the server in response to the request.

13. The method of claim 1 wherein the object is detected to be malicious as being part of a multi-flow attack comprising a plurality of flows, and the report indicates whether each of the UUTs detects each of the plurality of flows of the multi-flow attack.

14. The method of claim 1 further comprising:
providing a test computer to run a test application, and the endpoint comprises a virtualized endpoint instantiated by the test application, and displaying a comparison of the one or more UUTs on a computer display comprising the report.

15. The method of claim 4 wherein the IP address of the remote server is a public IP address where the remote server is connected to the endpoint over a public network and resides on the public network.

16. The method of claim 4 wherein the IP address of the remote server is a private IP address where the remote server is connected to the endpoint over and resides on a private network.

17. The method of claim 1 further comprising:
receiving indicators of compromise (IOCs) at a test application running on the test console of the testing network, the received IOCs serving as a baseline of first behaviors associated with the object processed by the endpoint; and
comparing the received IOCs with IOCs having second behaviors monitored during processing of the object in the endpoint to determine whether the object constitutes a malicious object.

18. The method of claim 17 wherein the endpoint corresponds to the virtualized endpoint including a detection agent configured to monitor for the second behaviors during processing of the object.

19. The method of claim 1 further comprising:
receiving indicators of compromise (IOCs) at a test application running on a test console of the testing network, the received IOC's serving as a baseline of first behaviors monitored during processing of the object in the endpoint; and
comparing the received IOCs with IOCs having second behaviors detected by each of the one or more UUTs to determine the efficacy of each of the one or more UUTs in detecting whether one or more objects provided in each copy of the response is malicious or benign.

20. A system comprising:
a server storing a plurality of samples including objects identified as benign and objects identified as malicious; and
a test computer coupled to the server via a network, the test computer having a first processor, the test computer configured to:
send one or more requests over the network to acquire the plurality of samples, each request of the one or more requests includes a uniform resource locator (URL),
modify each request of the one or more requests to re-direct the request to the server by at least obscuring address information associated with the request to render ineffective malware detection through address blacklisting by one or more security devices,
receive a response to each request from the server with a copy of the response being redirected to the one or more security devices, the response including one or more samples, each sample having an object for processing by the test computer,
process the object to detect whether the object is either malicious or benign, and
generate a report of detection of the object for each of the plurality of samples as either malicious or benign.

21. The system of claim 20 wherein the test computer is further configured to:
modify a header of each request to include an internet protocol (IP) address of the server.

22. The system of claim 20 wherein the plurality of samples includes a mixture of objects identified as benign and objects identified as malicious that render malware detection by address blacklisting ineffective for one or more units under test (UUTs), each of the one or more UUTs being configured to receive a copy of the response to each request from the server.

23. The system of claim 20 wherein the network is a testing network isolated from a private network.

24. The system of claim 20 wherein the first processor of the test computer is adapted to execute software in one or more virtual machines.

25. The system of claim 20 wherein the server further comprises:
a second processor adapted to execute an authenticating proxy configured to authenticate the test computer as entitled to receive the one or more test samples indicated in the one or more requests, and wherein the sample database is a secure database.

26. The system of claim 20 wherein the server further comprises:
a second processor adapted to execute a content engine configured to use one or more portions of the URL as an index to obtain a sample from the database stored at the server.

27. The system of claim 20 wherein the malware objects includes advance malware developed to avoid detection.

28. The system of claim 20 wherein the network is a testing network isolated from a production network, and further comprising:
a switch communicatively coupled to the one or more UUTs, the switch being configured to generate the copy of the response and provide the copy of the response to each of the one or more UUT.

29. The system of claim 24 wherein the test computer is further configured to:
determine whether a virtualized endpoint in a first virtual machine of the one or more virtual machines is compromised by using indicators of compromise received from the server.

30. The system of claim 20, wherein each request of the one or more requests is re-directed while maintaining the URL of the request as an alias destination domain.

31. A non-transitory computer readable media containing instructions for execution on a processor for a method comprising:
modifying a destination internet protocol (IP) address of each request of one or more requests to re-direct the request to the remote server and obscure address information associated with the request to render ineffective malware detection through address blacklisting by one or more units under test (UUTs), wherein each request of the one or more requests initiated by a virtualized endpoint to acquire a plurality of samples stored at a remote server, each request having a uniform resource locator (URL); and
receiving a response to each request at the virtualized endpoint, the response including one or more samples, each sample having an object for processing by the virtualized endpoint, the object being either malicious or benign, wherein
processing the object at the virtualized endpoint to detect whether the object is either malicious or benign, wherein
a copy of the response is provide to the one or more UUTs, wherein a mixture of objects identified as benign and objects identified as malicious provided as part of the response renders malware detection by address blacklisting ineffective for the one or more UUTs; and
a report of detection of the object for each of the plurality of samples identified as malicious or benign by each UUT is generated.

32. The non-transitory computer readable media of claim 31 wherein the remote server is communicatively coupled to the virtualized endpoint over a public network.

33. The non-transitory computer readable media of claim 31 wherein the plurality of samples includes a mixture of objects identified as benign and objects identified as malicious.

* * * * *